United States Patent [19]

Ralph

[11] Patent Number: 4,869,444
[45] Date of Patent: Sep. 26, 1989

[54] ADJUSTABLE TWO-STAGE AIRCRAFT LANDING GEAR SYSTEM

[75] Inventor: Harry C. Ralph, Kirkland, Wash.

[73] Assignee: The Boeing Company, Seattle, Wash.

[21] Appl. No.: 208,364

[22] Filed: Jun. 17, 1988

Related U.S. Application Data

[63] Continuation-in-part of Ser. No. 913,850, Sep. 30, 1986, Pat. No. 4,770,372.

[51] Int. Cl.⁴ ............................................. B64C 25/22
[52] U.S. Cl. ................................ 244/104 FP; 280/707
[58] Field of Search ............ 244/100 R, 102 R, 104 R, 244/104 FP; 280/707

[56] References Cited

U.S. PATENT DOCUMENTS

| | | | |
|---|---|---|---|
| 2,731,218 | 1/1956 | Bonar | 244/104 |
| 2,732,152 | 1/1956 | Neilson et al. | 244/104 |
| 2,856,180 | 10/1958 | Westcott | 244/102 R |
| 4,506,869 | 3/1985 | Musclef et al. | 244/104 FP |
| 4,657,280 | 4/1987 | Ohmori et al. | 280/707 |
| 4,685,689 | 8/1987 | Takizawa et al. | 280/707 |
| 4,722,547 | 2/1988 | Kishi et al. | 280/707 |
| 4,765,648 | 8/1988 | Mander et al. | 280/707 |

FOREIGN PATENT DOCUMENTS

| | | |
|---|---|---|
| 1577261 | 6/1969 | France . |
| 542817 | 1/1942 | United Kingdom . |
| 635885 | 4/1950 | United Kingdom ............ 244/102 R |
| 1109254 | 4/1968 | United Kingdom ............ 244/102 R |
| 2101542 | 1/1983 | United Kingdom . |

*Primary Examiner*—Galen L. Barefoot
*Attorney, Agent, or Firm*—Seed and Berry

[57] ABSTRACT

A two-stage aircraft gear. The landing gear includes a cantilever landing gear whose lower end is attached to a trailing arm (or articulated) landing gear. The cantilever gear is a collapsible piston-cylinder assembly, and the trailing arm gear also has a shock absorber connected between a fixed portion of the trailing arm gear and the movable wheel support arm. When landing, the load imposed is first absorbed by the trailing arm landing gear. After the trailing arm gear has been fully compressed, the cantilever gear begins to compress. The cantilever and trailing arm landing gear can be combined to provide the desired performance. The landing gear static position can be designed to be in the static load curve of the first component, allowing the aircraft to be stably supported and yet difficult to overturn. Adjustable orifice plates contained within one or both of the cantilever and articulated stages can be controlled as a function of the vertical descent velocity and/or distance. If desired, differential pressure measurements within the two stages can be used to give the landing gear any desired damping and/or landing gear extension characteristic.

7 Claims, 7 Drawing Sheets

ADJUSTABLE TWO-STAGE AIRCRAFT LANDING GEAR SYSTEM CROSS REFERENCE TO RELATED APPLICATION

This is a continuation-in-part of copending application Ser. No. 913,850, filed Sept. 30, 1986, now U.S. Pat. No. 4,770,372, issued Sept. 13, 1986.

1. Technical Field

This invention relates to aircraft landing gear, and more particularly, to a two-stage aircraft landing gear having the load characteristics of an articulated landing gear in its first stage of compression and the load characteristics of a cantilevered landing gear in a successive stage of compression.

2. Background Art

The two most common landing gear configurations are (1) the cantilevered type and (2) the articulated (or trailing arm) type. The cantilevered landing gear configuration has a wheel supported by a spring-shock absorber assembly that is a piston mounted in a cylinder filled with a compressed gas (such as nitrogen) and an oil (such as silicone). The piston has orifices that communicate from one side of the piston head to the other side, the orifices being covered by the oil. The landing gear obtains a spring characteristic from the compressibility of the gas and a shock absorber characteristic from the passage of the oil through the orifices. The static response of the cantilevered gear is determined by the gas spring, while its dynamic response is determined by both the gas spring and the shock absorber. Because this configuration exhibits the static characteristics of a single-stage spring, the cantilevered gear has a long, static axle travel. This greatly reduces the vertical separation between the underbody of the aircraft and the ground, this separation also being known as the "headroom."

Occasionally, in an attempt to reduce this long, static, axle travel, two-stage spring assemblies are used in cantilevered gear. However, these two-stage springs create undesirable service problems because they contain two interrelated pressures which must be continually balanced for the two-stage spring to operate consistently.

When a cantilevered landing gear is fully extended, the ratio of extension of the strut beyond the cylinder body to the length of the strut remaining in the cylinder body is very high. The horizontal loads created by landing with such gear cause very high bearing friction between the strut and the cylinder body and consequently cause abnormal wear at this point. The cantilevered gear configuration, when used with aircraft presenting high vertical landing velocities, and, consequently, high dynamic loads, necessitates the use of long, slender gear and results in large deflections in the fore, aft, and side directions.

An articulated (or traveling arm) landing gear utilizes a wheel mounted at the end of an arm that pivots vertically about a horizontal axis. The pivotal movement of the arm is resiliently restrained by a gas- and oil-filled spring-damper assembly, of the type described above, extending between the pivot arm and a fixed support. As with the cantilevered gear, the articulated gear also experiences reduced headroom because of the long axle travel required to achieve static balance. The length of the trailing arm is proportional to the vertical axle travel, so that large axle travel requires a long trailing arm and results in heavy and bulky hardware, including a pivot fitting. This is particularly true when a great deal of kinetic energy must be dissipated in the landing, i.e., the landing has a high ground reaction factor.

Aircraft landing gear incorporating both a cantilevered strut, including a piston-cylinder spring-damper assembly, and a bogie supporting one or more landing gears pivoting in a vertical plane around the lower end of the strut have also been used. Some shocks experienced by the bogie are contained by a shock absorber connected between the bogie and the part of the cantilevered strut that is attached to the aircraft. However, such landing gear are unnecessarily complex, bulky, and difficult to maintain. In addition, these gear suffer from the extensive vertical axle travel problems of cantilevered and articulated landing gear.

It is well known that the length of axle travel of aircraft landing gear compress to absorb landing load kinetic energy. This kinetic energy and the work done by the landing gear are equal, and both are proportional to the weight of the aircraft. Therefore, the axle travel, i.e., the distance through which the kinetic energy is dissipated, is independent of the weight of the aircraft. This means that, for the same vertical descent velocity, the axle travel required when landing a smaller aircraft is identical to that required for a larger aircraft, but is a greater proportion of the headroom available. In other words, the landing gear of a large aircraft may be capable of being compressed through a range that is several times longer than the range of compression of a small aircraft's landing gear. Yet the landing gears for both smaller and larger aircraft will be compressed by the same amount when landing at the same vertical velocity. Accordingly, the headroom limitations for small aircraft, which are designed to be closer to the ground, are more problematical than are the limitations for larger aircraft. In particular, small aircraft capable of landing with high descent velocities have severe headroom problems.

Generally, landing gears supporting a stationary aircraft are static at approximately 80–90% of the available landing gear axle travel. Because the load-axle travel characteristics of landing gear are usually very stiff at these long strokes, a stationary aircraft is very stable. On the other hand, the landing gear stroke remaining between the static and the fully compressed positions is usually too small to allow the aircraft good rough field performance.

It has been known in the past to actuate landing gear in accordance with a measured horizontal velocity. For example, landing gear have been used to launch an airplane that has reached a critical takeoff speed. This has been accomplished by suddenly increasing the pressure in a landing gear spring-shock absorber assembly when the critical speed has been reached. This gives the aircraft a sudden increase in its vertical velocity which greatly reduces the length of runway required for takeoff.

However, it has not been known to provide an aircraft landing gear that can adjust its rate of change of length in accordance with the vertical descent velocity experienced by the aircraft.

DISCLOSURE OF THE INVENTION

It is an object of the present invention to provide an aircraft landing gear having a two-stage landing load characteristic.

It is another object of the present invention to provide an aircraft landing gear having reduced headroom requirements.

It is yet another object of the present invention to provide a two-stage aircraft landing gear whose static position is in the first stage.

It is a further object of the present invention to provide an aircraft landing gear capable of allowing extensive vertical axle travels for aircraft which land at high vertical velocities.

It is still another object of the present invention to provide a two-stage aircraft landing gear particularly adapted for use on rough landing fields.

A still further object of the present invention is to provide an aircraft landing gear system that can adjust its damping response or rate of change of length in accordance with the vertical descent velocity experienced by the aircraft.

These and other objects of the invention are accomplished by an aircraft landing gear including a first cantilevered strut having first and second ends defining a longitudinal axis and a length that is a first function of the compressive force applied to the strut along the longitudinal axis. The strut is attachable to the aircraft at its first end. The landing gear further includes a trailing arm having an upper first end pivotally secured to the second end of the first strut and a wheel attached to a lower end of the trailing arm, the wheel being rotatable about a horizontal axis. Further, the landing gear comprises a second strut pivotally connected between the trailing arm and the lower second end of the first strut. The second strut has a length that is a second function of the compressive force applied to it. The above combination produces a landing gear which is capable of two-stage operation.

In the two-stage landing gear of the present invention, the articulated gear, including the trailing arm, the rotatable wheel, and the second strut, initially responds to an applied load. This response continues as the load increases beyond the static load of the aircraft, at which point the second shaft of the articulated gear has been fully compressed. As additional load is applied, the landing gear enters its second stage, where the first cantilevered strut begins to collapse. The landing gear continues to collapse with the increasing load until the first cantilevered gear is fully collapsed. The static load position of this landing gear occurs within the first stage, and so substantially greater headroom can be provided with this gear while maintaining the stiffness characteristic desired to provide greater stability to the static aircraft. When landings are made with relatively low vertical velocities, the landing gear stays in its first stage. However, when the landings have greater vertical velocities, the landing gear enters its second stage, substantially increasing the vertical stroke that can be taken by the landing gear. The extra stroke provided by the second stage is particularly useful when landing on or taking off from a rough field. The size and weight of the trailing arm and all related components are minimized due to the relatively small axle travel involved with the two-stage landing gear.

In another aspect of the invention, the landing gear is adjustable. It comprises means for measuring a vertical descent velocity of the aircraft and producing a velocity signal in response thereto. It also comprises a first strut having first and second ends defining a first axis and separated by a variable first distance. The first strut includes means for receiving the velocity signal and controlling the rate at which the first distance varies as a first function of a first compressive force applied to the first strut along the first axis.

The adjustable landing gear also comprises a trailing arm having an upper first end pivotally secured to the second end of the first strut and a wheel attached to a lower end of the trailing arm. The wheel is rotatable about a horizontal axis.

Finally, the adjustable landing gear comprises a second strut pivotally connected to the trailing arm. The second strut is pivotally supported through the second end of the first strut. The second end of the first strut and the connection of the second strut to the trailing arm defines a second axis. They are separated by a variable second distance. The second strut is subjected to a second compressive force along the second axis.

The second strut includes means for receiving the velocity signal and controlling the rate at which the second distance varies as a second function of the second compressive force.

BEST MODE FOR CARRYING OUT THE INVENTION

Figure 1:
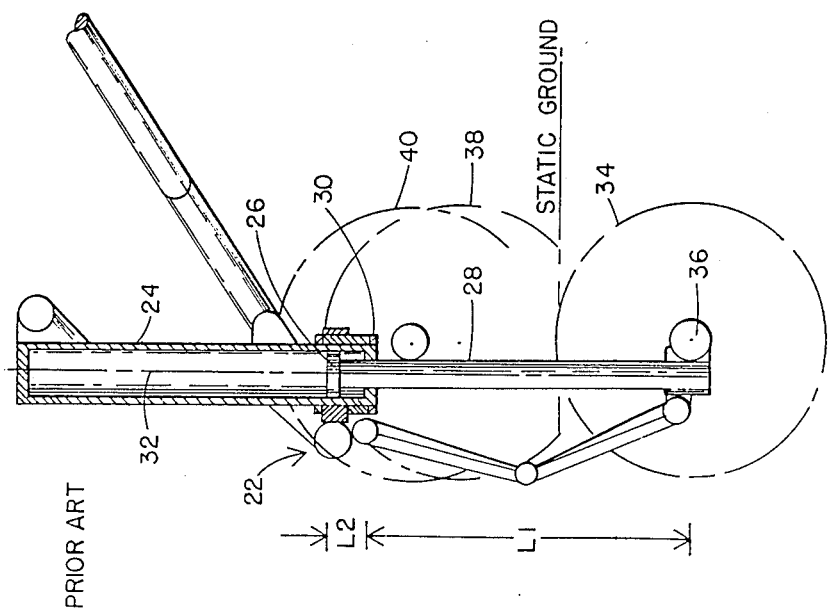
FIG. 1 is an elevational view of a prior art cantilevered aircraft landing gear, with phantom views showing both static and fully compressed wheel positions.

Referring now to FIG. 1, a cantilevered landing gear 20 known in the prior art includes a piston-cylinder assembly 22 having cylinder 24 containing piston 26 within. Strut 28, attached to the piston, extends beyond closed end 30 of the cylinder. The cavity 32 of the cylinder can contain a compressible gas, such as nitrogen, and possibly an oil, which is forced to pass through small orifices in the piston. This strut is a spring-damper assembly. The piston has small clearances with respect to the inner walls of the cylinder, and the strut, passing through end 30 of the cylinder, has close tolerances with the inner diameter of the end cap at end 30. When the aircraft is airborne and thus not supporting the weight of the aircraft, the piston and attached strut are fully extended within the cylinder. Wheel 34, attached to the downwardly disposed end of the strut at a horizontal axle 36, moves upwardly with respect to the cylinder as the landing gear begins to absorb the landing load of the aircraft. After the aircraft has landed, the static position of the wheel is as indicated by the wheel in phantom-view position 38. The fully compressed position of the wheel is shown in phantom view 40.

Upon landing, the high drag loads created as the wheel is caused to spin up to landing speed react horizontally against the wheel-supporting strut. When the landing gear is in its fully extended position, the extension $L_1$ of strut 28 beyond cylinder end 30 is significantly greater than the length $L_2$ of the strut 28 remaining in the cylinder 24. Consequently, the bending couple between the strut 28 and cylinder 24 resulting from the high horizontal loads on the strut 28 produce high bearing loads between the piston 26 and the inner wall of the cylinder 24, and between the strut 28 and the end of the cylinder 24. These high bearing loads produce substantial bearing friction and wear.

Figure 2:
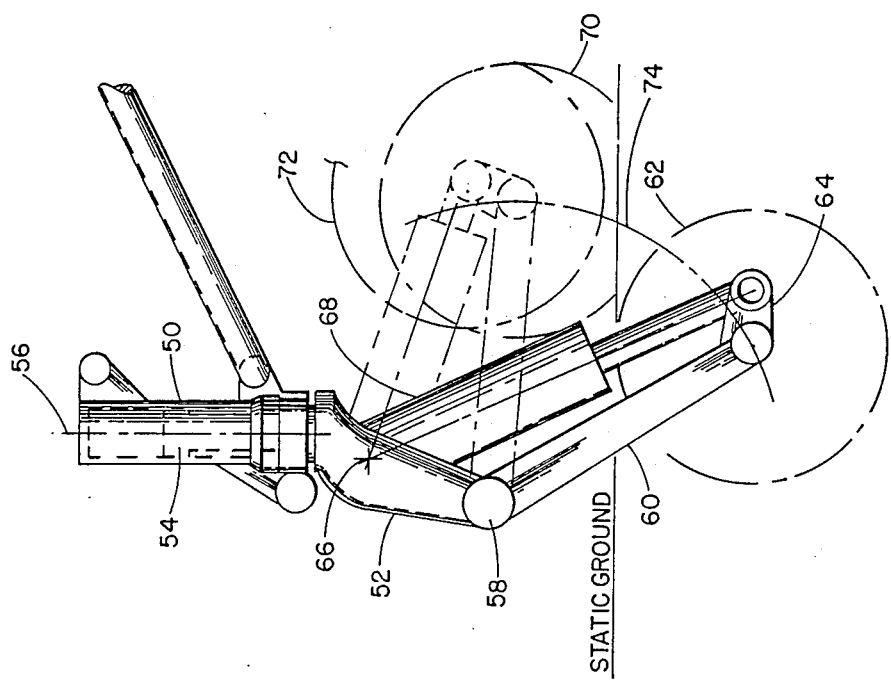
FIG. 2 is an elevational view of a prior art articulated (traveling arm) landing gear, with phantom views showing the static and fully compressed attitudes of the landing gear.

FIG. 2 shows a prior art articulated (or trailing arm) landing gear. In its fully extended condition, this landing gear hangs from support 50, which is attached to the aircraft at its upper end. Wheel support arm 52 has an extending piston which reaches into a cylindrical cavity of support 50. This allows the support arm to pivot about the vertical axis 56. A trailing arm 60 is pivotally connected to the lower end of support arm 52 about a horizontal pivot axis 58. A wheel 62, also rotatable about a horizontal axis, is attached to the lower end of trailing arm 60. A spring-damper strut 68 is connected between a boss 64 and a swivel point 66 on the wheel support arm 52. Shown in phantom views are the rest position 70 and the maximum vertical travel position 72, respectively, of wheel 62. As a load is applied to wheel 62, the wheel support arm rotates about point 58, causing the axle of wheel 62 to follow the semicircular path 74.

Figure 3:
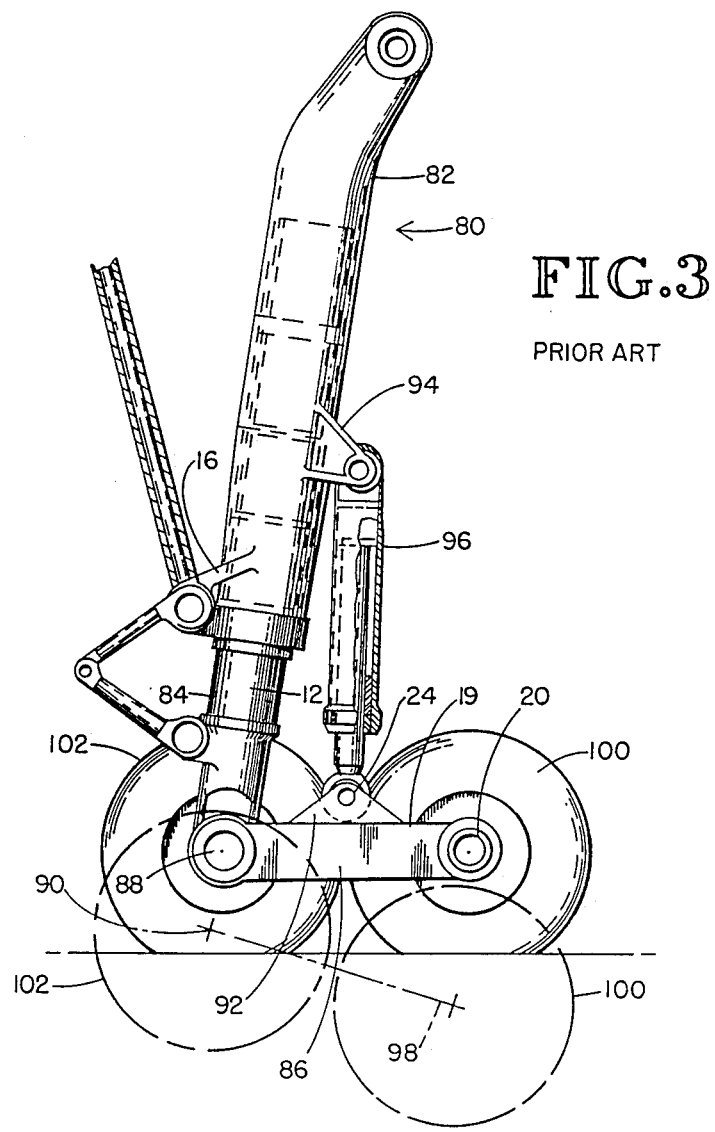
FIG. 3 is an elevational view of a prior art bogie-type aircraft landing gear in its static position, with phantom views showing the position of the gear with no load applied.

FIG. 3 is an elevational view of a prior art bogie-type landing gear, such as is used in larger commercial aircraft. An example is disclosed in U.S. Pat. No. 2,731,218, to Bonar. In this gear, telescoping strut 80, comprising cylindrical portion 82 and piston portion 84, is supported from the aircraft at its upper end. Telescoping strut 80 does not serve a shock absorbing function, but serves solely as a structural guide. A bogie 68 is attached at point 88 to the lower end of the piston portion of the telescoping strut. In reaching its fully relaxed state, the telescoping strut extends until point 88 reaches location 90. A spring-damper 96 is connected between boss 92 and boss 94 on the cylindrical portion of the telescoping strut. When the aircraft becomes airborne, spring-damper 96 extends, allowing the bogie 86 to droop to a position indicated by line 98.

Rear wheel 100 is oriented to be the first wheel to touch the ground upon landing. Subsequently, as more load is absorbed by the landing gear, spring-damper 96 collapses slightly until both wheels 100 and 102 are touching the ground. Beyond this point, as further load is applied to the landing gear, both spring-damper 80 and spring-damper 96 collapse further, until the landing gear assumes the configuration shown in solid lines in FIG. 3. This static position is characterized as being a relatively large vertical distance removed from the vertical distances of its components when no load is applied.

Figure 4:
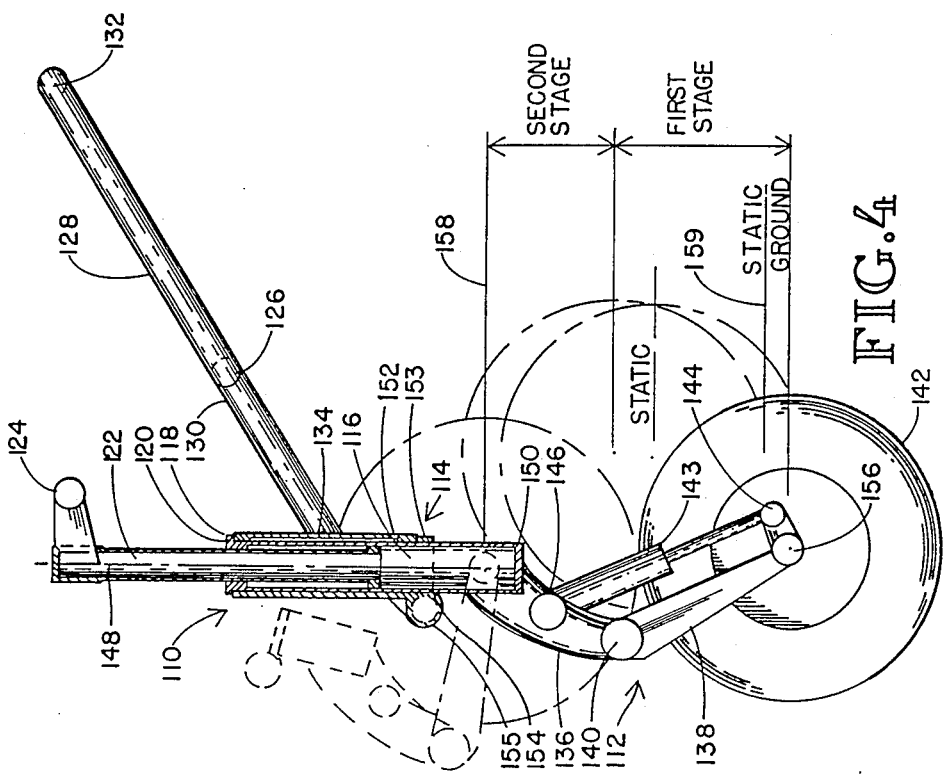
FIG. 4 is an elevational view of a first embodiment of a two-stage aircraft landing gear comprising both cantilevered and articulated landing gear.

FIG. 4 shows a first embodiment of a two-stage landing gear according to the present invention. It can readily be seen to be a combination of cantilevered telescoping strut 110 and trailing arm 112. The strut 110 comprises a cylinder 114 containing a piston assembly 116, to form a fluid spring, and may also include a damping fluid and orifices through the piston head to form a fluid spring-damper. According to this construction, strut 110 has a longitudinal axis and assumes a length that is a function of the load applied to the strut along this axis. The length of strut 110 is also a function of the orifice area of the orifices (to be discussed subsequently) formed in the piston assembly 116. It is particularly advantageous to control the orifice area to obtain the desired static and dynamic strut responses, which may be established as a function of the vertical descent velocity of the aircraft.

The length of strut 110 can be maintained within predetermined limits by the incorporation of physical stops in its structure. Cylinder 114 has an end cap 118 containing a seal 120 through which support 122 extends. The support is integral with the piston in the cylinder, and the upper end of the support pivotally attaches to the aircraft at boss 124. A support 126, comprised of an upper linkage 128 pivotally connected to a lower linkage 130, extends between the aircraft and the cylinder. Upper linkage 128 is pivotally attached to the aircraft at point 132, while the lower linkage 130 is pivotally attached to the cylinder 114 at point 134. The support 126 is used to retract the landing gear by pivoting support 122 about boss 124, and it also braces the landing gear in its lowered configuration. As will be apparent to those skilled in the art, an increase in the load borne by the strut 110 will cause the overall length of the assembly to decrease, the assembly rotating in a clockwise direction about boss 124. This rotation is constrained by the length of support 126.

An extension 136 extends downwardly from the lower portion of strut 110. The lower end of the extension 136 is pivotally attached to a wheel support arm 138 at point 140. A wheel 142 is attached by means of a horizontal axle to the lower end of wheel support arm 138. A telescoping fluid spring 143 (or possibly a spring-damper) connects a point on boss 144 to a point 146 on the extension. The length of fluid spring 143 is a function of the load applied between its two ends.

The landing gear of FIG. 4 is steerable by rotation about vertical axis 148. The lower portion of the cylinder is a sleeve 150. The sleeve rotates about axis 148 within an outer shell 152 of the cylinder. By means of a rack and pinion consisting of a ring gear 153 placed circumferentially around sleeve 150 and a pinion 154 driven by a hydraulic actuator 155 attached to the outer shell, the trailing arm can be steered.

In its unloaded condition, the strut 110 is fully extended, with the axis of strut 110 being approximately vertical and the trailing arm 112 falling downward to the extent permissible by the strut 143 connecting points 144 and 146. As the wheel 142 contacts the ground and the load imposed on the landing gear increases, the overall distance between axle 156 and boss 124 is decreased, at first by a rotation of arm 138 about pivot point 140. This rotation can continue until the landing gear reaches a second stage, at which point the wheel support arm may have passed beyond horizontal. Beyond this point, with the landing gear in its second stage, the vertical distance between the axle and boss 124 decreases further by a decrease in the length of strut 110. This collapse can continue until the vertical location of the axle 156 reaches the level indicated by line 158, denoting the end of the second stage travel. In this configuration, the static load is maintained with virtually no compression of the landing gear. This is indicated by static ground line 159. Accordingly, it can be seen that the landing gear of FIG. 4 realizes substantial headroom while continuing to exhibit two distinct stages in its load-travel curve. This latter aspect will be described in greater detail subsequently.

Figure 5:
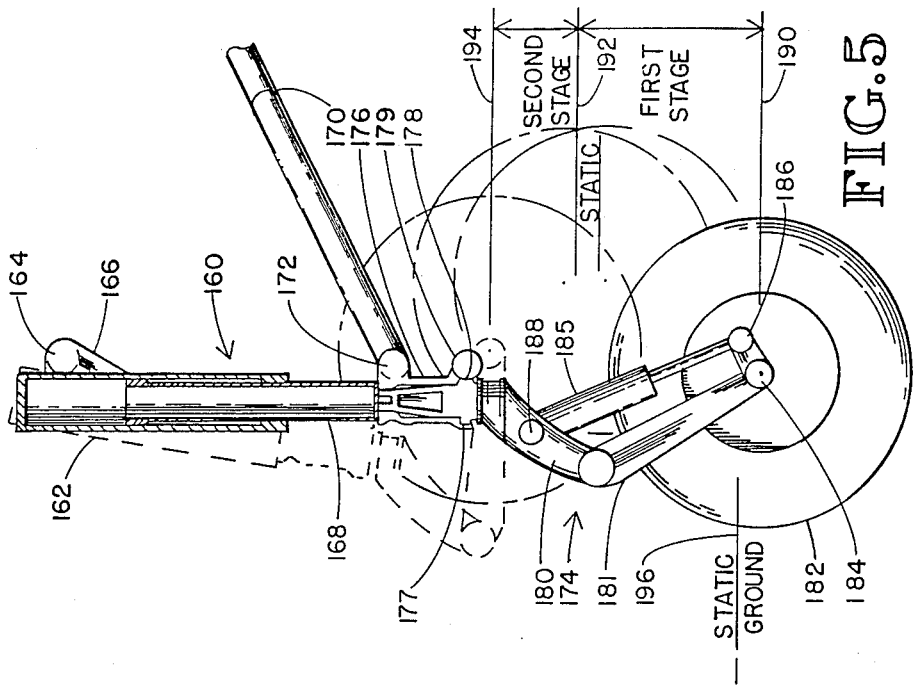
FIG. 5 is an elevational view of a second embodiment of a two-stage aircraft landing gear combining cantilevered and articulated landing gear.

FIG. 5 of the drawings illustrates yet another embodiment of a landing gear according to the present invention. In this embodiment, cantilevered telescoping strut 160 is inverted from strut 110 of FIG. 4. In particular, its cylindrical part 162 is attached to the aircraft at point 164 on boss 166, which is integral with the cylinder. The piston part 168 telescopes inside the cylinder, realizing a shortening of its overall length as the load increases on the landing gear. As shown in FIG. 4, the landing gear of FIG. 5 also includes a support 170 whose lower end is pivotally attached to a boss 172 on the piston part of the piston-cylinder assembly and whose upper end (not shown) is attached to the aircraft. Thus, as the load increases on the strut 160, the strut 160 rotates clockwise.

Trailing arm assembly 174 is rotatably attached to the lower end of strut 160 at bearing 176. By this configuration, the trailing arm assembly 174 can rotate about the axis of the strut 180, either freely or under the control of a steering mechanism. The steering mechanism comprises ring rack 177, pinion 178, and hydraulic actuator 179, and operates in the same fashion as the steering mechanism of FIG. 5.

The trailing arm assembly 174 also includes an extension 180 extending downwardly from bearing 176 and a trailing arm 181 pivotally attached to the extension 180 at its upper end and to wheel 182 by horizontal axle at its lower end 184. A telescoping strut 185 is connected between a point 186 on the lower end of the trailing arm and point 188 on the extension 180 of the traveling arm assembly 174.

The two-stage characteristic of the landing gear shown in FIG. 5 is very similar to that shown in FIG. 4, with the first portion of the load borne by the strut 185 of the trailing arm assembly 174 and further load being absorbed by collapse of the strut 160. The unloaded axle level is indicated by line 190, the transition between the first and second stages by line 192, and the end of the second stage by line 194. As with the landing gear of FIG. 4, the embodiment in FIG. 5 has a static ground level 196 which is only a small fraction of the total vertical travel achievable by this landing gear.

The landing gear shown in FIGS. 4 and 5 differ from the prior art of FIGS. 1 and 2 in that the landing gear of the present invention actuates in two distinct stages, while the landing gear in FIGS. 1 and 2 are single-stage landing gear. As will be shown subsequently, the response of the two-stage landing gear of the present invention differs substantially from the response of the prior art landing gear shown in FIGS. 1 and 2.

The landing gear of the present invention shown in FIGS. 4 and 5 also differ substantially from the prior art landing gear of FIG. 3. Referring to FIG. 3, strut 96 can be seen to connect a point on bogie 86 to the cylindrical portion 82 of spring-damper 80, which is flexibly connected to the aircraft. The landing gear of the present invention, however, shows the struts 143 and 185 in FIGS. 4 and 5, respectively, connected between the wheel ends of the respective trailing arms 138 and 181, and points respectively on wheel support arm 138 (FIG. 4) and extension 180 (FIG. 5). These latter two points are attached to the lower portion of the respective cantilevered struts 110 and 160. The linkage of the landing gear of FIGS. 4 and 5 is fundamentally different from the linkage of the prior art landing gear in FIG. 3, because the two struts of the prior art landing gear shown in FIG. 3 cannot collapse independently, whereas the two struts of each of the landing gear in FIGS. 4 and 5 do. It is precisely the two-stage operation of the present invention that leads to a new and particularly advantageous form of landing gear.

Figure 6:
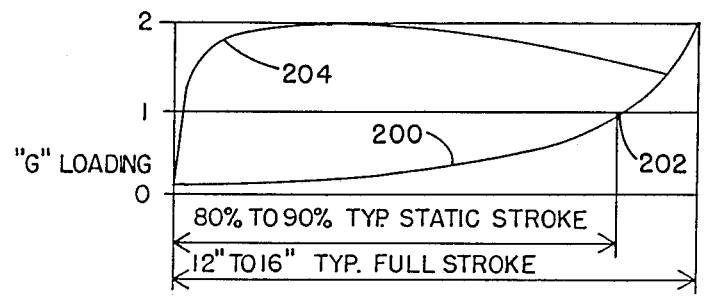
FIG. 6 is a landing load curve for a prior art single-stage landing gear designed for a maximum vertical descent velocity of 12 feet/second.

FIG. 6 shows a typical load-stroke curve for a land-based aircraft having a single-stage landing gear. Such an aircraft has a typical maximum vertical descent velocity of 12 feet/second and 12-16 inch typical full stroke. The horizontal axis of the coordinates in which these curves are presented is the vertical stroke experienced by the landing gear, while the vertical axis of the coordinate system is the load absorbed by the landing gear, expressed as the ratio between the landing force and the weight of the aircraft. Thus, curve 200, the static load curve, shows the stroke experienced for a given fraction of aircraft weight. Point 202 is where curve 200 crosses the load abscissa corresponding to the static weight of the aircraft (i.e., "g"=1). It can be seen that the stroke corresponding to this point is roughly between 80-90% of full stroke. A typical dynamic curve for such an aircraft using a one-stage landing gear is shown by curve 204. The forces experienced by such landing gear can typically be as high as twice the static weight of the aircraft. In a landing, this maximum level can be experienced before the landing gear has traveled even 50% of its full stroke.

Figure 7:
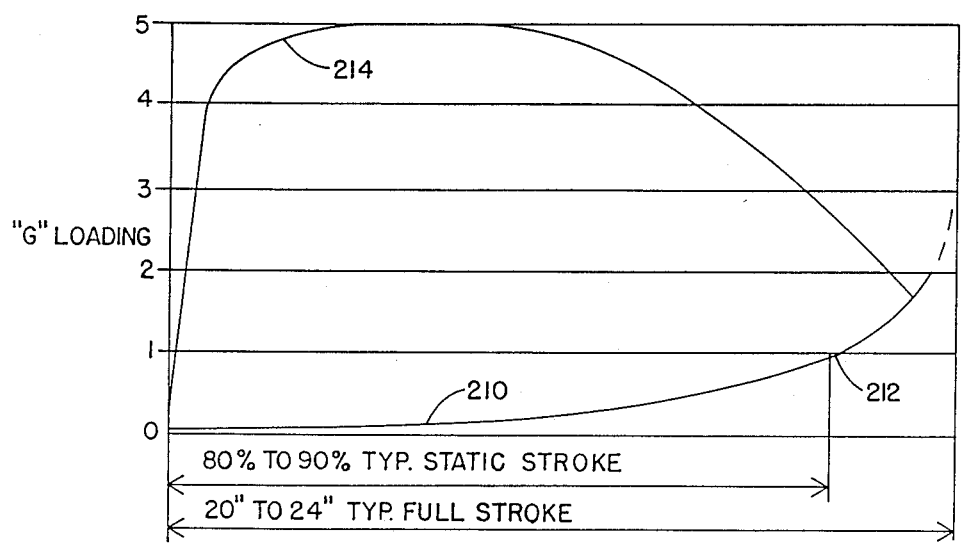
FIG. 7 is a landing load curve for a prior art single-stage landing gear designed for a maximum vertical descent velocity of 24 feet/second.

FIG. 7 presents curves corresponding to those shown in FIG. 6, but for an aircraft based on an aircraft carrier. Such aircraft can experience a typical maximum vertical descent velocity of 24 feet/second, and the landing gear must be designed to absorb as much as five times the static weight of the aircraft. Curves 210 and 214 correspond to curves 200 and 204 of FIG. 6, and point 212 corresponds to point 202 of FIG. 6.

Figure 8:
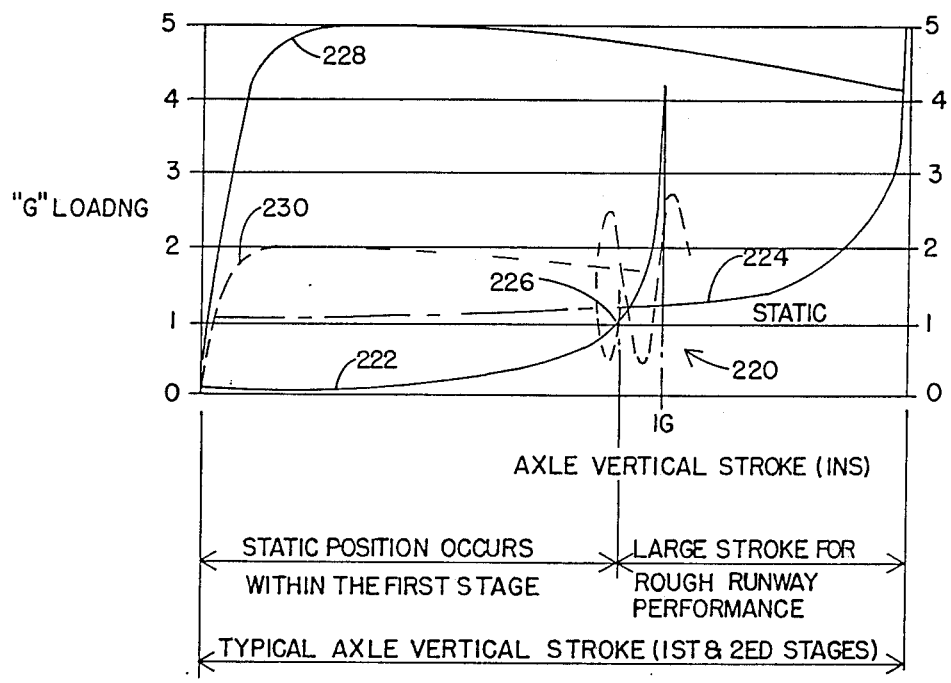
FIG. 8 of the drawings is a landing load curve for a two-stage aircraft landing gear of the present invention.

FIG. 8 shows typical load-stroke curves for an aircraft carrier-based aircraft using a two-stage landing gear according to the present invention. As mentioned above, such aircraft can experience a maximum vertical descent velocity of 24 feet/second and the landing gear can experience loads as great as five times the static weight of the aircraft. Static curve 220 consists of two subcurves: first stage subcurve 222 and second stage subcurve 224. In the first stage, as the load supported by the two-stage landing gear is slowly increased, because its collapse is characterized by only one of the two components of the landing gear (for example, the trailing arm landing gear component), subcurve 222 is simply the static curve corresponding to that single component. Proper designation of the parameters of this component allows the static position, indicated by point 226, to be located within the static curve describing the first stage. As the static load carried by the landing gear increases into the second stage, the static performance of a gear is characterized by subcurve 224. This characteristic curve corresponds to the second component of the landing gear.

Curve 228 shows a typical dynamic curve when the aircraft is used by a carrier-based aircraft landing at a maximum vertical descent velocity of 24 feet/second. Curve 230 shows the dynamic curve experienced when this same aircraft lands at a lower vertical descent velocity, for example, 12 feet/second. It is apparent from the curves of FIG. 8 that, by proper designation of the landing gear parameters, the static point for the landing gear can be achieved while using considerably less than 80-90% of the total vertical stroke available. In curve 220, the static position is located at a point described by approximately 60% of the total vertical stroke, although by proper design of the first stage, this static point can be located at substantially less than even 50% of the total vertical stroke available.

As illustrated in FIG. 8, there are three particular advantages of the two-stage landing gear of the present invention over landing gear known in the prior art. The first is that under static conditions, represented by point 226, the landing gear is "stiff," as represented by the slope of curve 222 at point 226. Secondly, because the static position of the two-stage landing gear occurs within the first stage, the landing gear can accommodate substantially more axle stroke before both struts have reached their end of travel. The landing gear, therefore, has substantially reduced headroom requirements as compared to the prior art. Finally, the extensive vertical axle travels provided by the two-stage landing gear makes it particularly suitable for use on rough landing fields.

Figure 9:
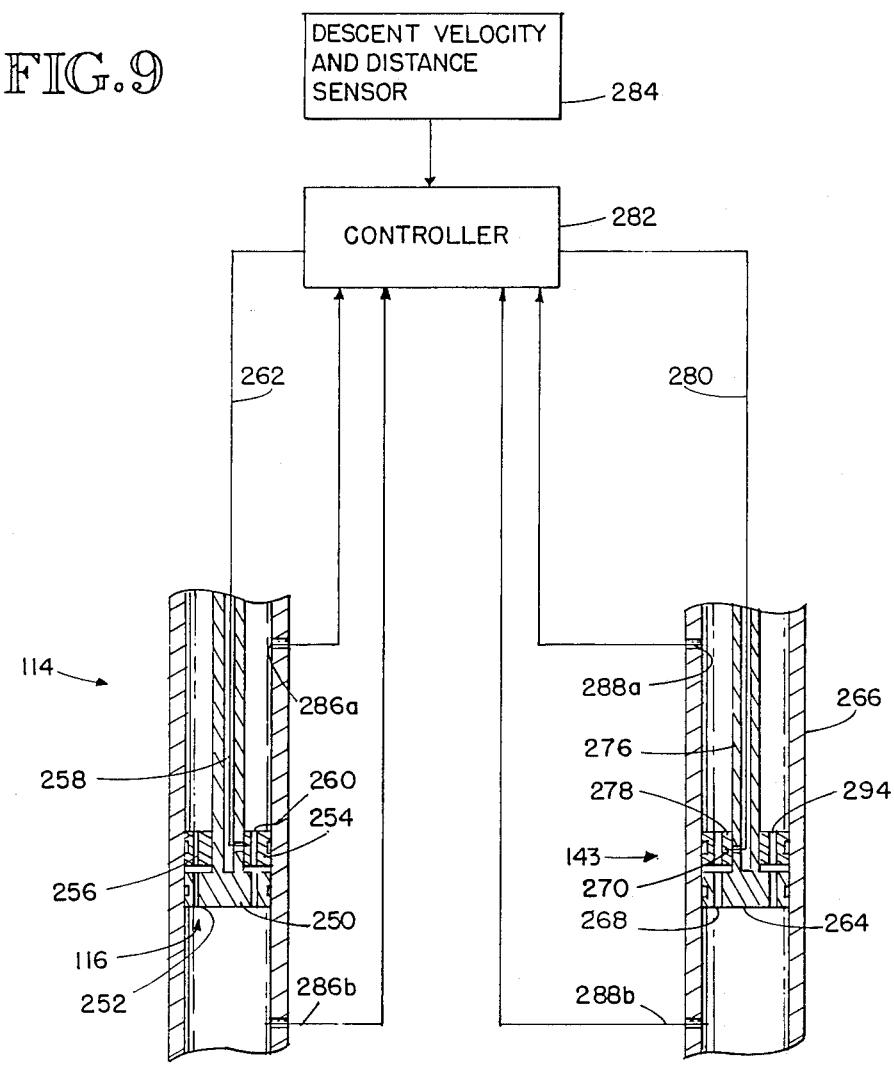
FIG. 9 is a schematic view of details of the two-stage landing gear shown in FIG. 4.

Turning to FIG. 9, the piston assembly 116, contained within the cylinder 114, can be seen to comprise a piston head 250 containing orifices 252, and a second orifice plate 254 containing orifices 256. Piston head 250 is attached to piston rod 258, which extends upwardly through end cap 118 (see FIG. 4). Orifice plate 254 includes a hole through which piston rod 258 extends. Orifice plate 254 can be caused to rotate about piston rod 258, with respect to piston head 250. This allows the orifices 256 in orifice plate 254 to brought into coincidence with the orifices 252 in piston head 250. The rotation of orifice plate 254 can be controlled through a conventional electromechanical device 260, which will be described subsequently. Electromechanical device 260 can be actuated by signals received through line 262, which can be led to device 260 through a passage formed in the piston rod 258.

Similarly, strut 143 (see FIG. 4) includes a piston head 264 contained within a cylinder assembly 266. Piston head 264 contains orifices 268, which allow the passage of a fluid contained within the strut 143. The strut 143 also includes a second orifice plate 270, including orifices 274, which can be caused to rotate about piston rod 276 by electromechanical device 278. Device 278 is responsive to electrical signals fed to it on line 280. The signals on lines 262 and 280 are produced by controller 282, which can, for example, be a programmed microcomputer.

The controller 282 also receives signals from a vertical descent velocity and distance sensor 284. Vertical descent velocity and distance sensor 284 can be made from any conventional sensor capable of making velocity measurements, such as radar, laser, and ultrasonic sensors (which can also make distance measurements), or inertial sensors. In addition, if desired, either one or both of the struts 114 or 143 can be equipped with pressure sensors 286a and 286b or 288a and 288b. The signals produced by these pressure sensors can also be received by the controller 282, to provide differential pressure data which can be used in a conventional feedback manner to determine the effect of adjustments of the orifice plates 256 and 270 on the movements of the piston assemblies 116 and 264.

Figure 10:
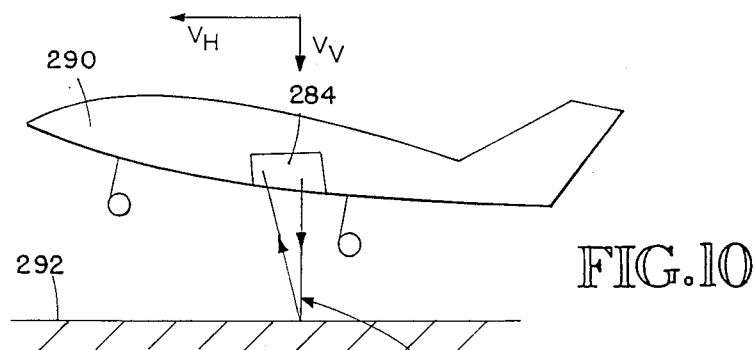
FIG. 10 is a schematic view of the installation of the vertical descent velocity and distance measurement sensor of one aspect of the invention.

FIG. 10 is a schematic view of the operation of the vertical descent velocity and distance sensor 284. The sensor 284 is located on the aircraft 290 and directs energy (electromagnetic or ultrasonic, for example) downwardly toward the runway 292. Through conventional distance and/or velocity measurement techniques, the vertical descent velocity of the aircraft 290 toward the runway 292 can be measured as the aircraft 290 is near the touchdown point. The velocity can be measured very accurately, either through doppler techniques or range rate techniques.

Figure 11:
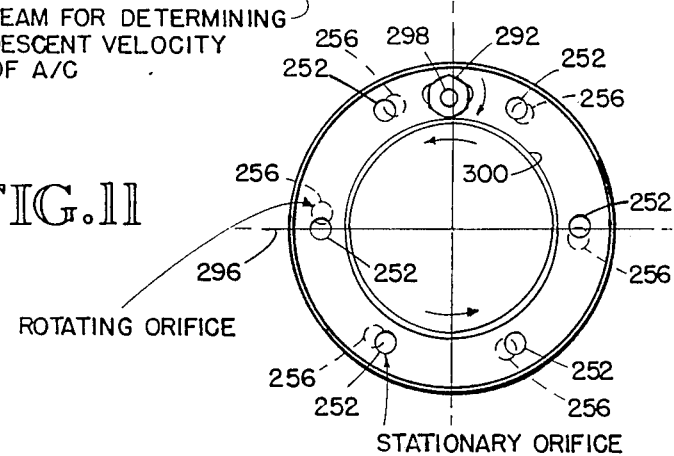
FIG. 11 is a front elevational view of one embodiment of the orifice adjustment mechanism of the invention.
Figure 12:
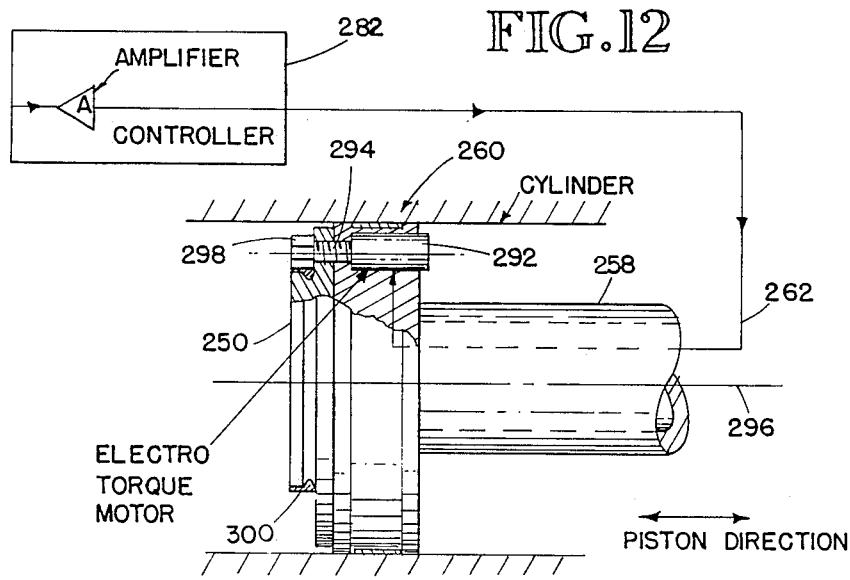
FIG. 12 is a side elevational view of one embodiment of the orifice adjustment mechanism of the invention.

FIGS. 11 and 12 are respectively side and front schematic views of one embodiment of the piston assemblies which can be built into the cylinders 114 and 143. Assuming that the schematic views of FIGS. 11 and 12 are directed toward the piston assembly 116 built into cylinder assembly 114, it can be seen that orifices 256 can be brought into continuously variable degrees of coincidence with orifices 252. This can be accomplished by electromechanical device 260, which can be an electric motor 292 having a shaft 294 which is parallel to the axis 296 of the piston rod 258. A toothed gear 298 is attached to the shaft 294. The teeth of the gear 298 mesh with teeth 300 formed on a outer circumference of the piston head 250. When the motor 292 is actuated by receiving an appropriate signal from the controller 282, the orifice plate 254, to which the motor 292 is affixed, rotates with respect to the piston head 250, causing the coincident area of the orifices 252 and 256 to change between a minimum (for example, no common coincident area) to a maximum.

A number of control strategies can be implemented from the basic structure described above. Based on continuous vertical descent velocities, the orifices can be continuously adjusted to provide a desired damping factor in the landing gear caused by the rate at which the fluid contained in the cylinder assemblies of the landing gear passes through the two orifice plates in each cylinder assembly. It may be desirable, for example, to follow a particular trajectory, defined in terms of vertical velocity and landing gear extension. Controlling the coincident orifice area and continually monitoring the vertical velocity and vertical distance above the runway (to measure landing gear extension) will cause this particular trajectory to be followed.

In another scheme, it may be desirable to control the damping rate of the two cylinder assemblies to minimize bounce of the aircraft as it lands. This can be accomplished by controlling the orifice plates so that particular predetermined pressure differentials are achieved across the pistons of each of the cylinder assemblies, after which the orifices are adjusted by the controller to produce a second desired damping response. If desired, these damping responses can be controlled as functions of time or current landing speed, as well.

The ability to control each of the cylinder assemblies independently allows the landing gear's response to tailored to both produce a desirable landing profile and to prevent damage to the landing gear assembly. For example, in some low vertical landing velocity situations, it is desirable to actuate only the articulated portion of the two-stage landing gear, since the articulated landing gear can absorb all of the vertical energy in a minimal stroke length. However, in higher vertical velocity landing situations, it is desirable to utilize both the articulated and cantilevered portions of the two-stage landing gear. This can be accomplished by preferentially actuating only the orifice plate in the articulated portion of the landing gear for low vertical landing velocities and both orifice plates for higher vertical landing velocities. Further, by coordinating the actuation of the two orifice plates in higher vertical velocity landings, it is possible to cause the cantilevered landing gear to "bottom out" before the articulated landing gear, even though the articulated landing gear is actuated first upon landing. These few examples are only illustrative of the flexibility possible with the few sensors described above. One skilled in the art will be able to modify these schemes and develop others that are within the scope and spirit of the present invention.

It will be apparent to those skilled in the art that a variety of modifications and alternative configurations of the landing gear of the present invention can be made without departing from the scope and spirit of the present invention. Such modifications will include, but not be limited to, the use of multiple coaxial wheels, gear having torque links, and foldable gear. It will also be apparent that, if desired, the first stage of actuation of the present landing gear can be compression of the cantilever gear, while the second stage is an actuation of the trailing arm gear.

I claim:

1. An adjustable landing gear for use with an aircraft, comprising, in combination:
    means for measuring a vertical descent velocity of said aircraft and producing a velocity signal in response thereto;
    a first strut having first and second ends defining a first axis, said first and second ends being separated by a variable first distance, said first strut including means for receiving said velocity signal and controlling the rate at which said first distance varies as a first function of a first compressive force applied to said first strut along said first axis, said first strut being attachable to said aircraft at said first end;
    a trailing arm having an upper first end pivotally secured to said second end of said first strut;
    a wheel attached to a lower end of said trailing arm, said wheel being rotatable about a horizontal axis; and
    a second strut pivotally connected to said trailing arm and being pivotally supported through said second end of said first strut, said second end of said first strut and said connection of said second strut to said trailing arm defining a second axis and being separated by a variable second distance, said second strut being subjected to a second compressive force along said second axis, said second strut including means for receiving said velocity signal and controlling the rate at which said second distance varies as a second function of said second compressive force.

2. The adjustable landing gear of claim 1 wherein said first strut comprises a fluid container enclosing a first fluid and including variable orifice means adapted to receive said velocity signal, said first fluid being caused to act upon said variable orifice means in response to said first compressive force and being urged to pass through said variable orifice means as said first compressive force varies.

3. The adjustable landing gear of claim 2 wherein said variable orifice means comprises first and second mating orifice plates, said plates being continuously adjustable with respect to each other between a minimum flow position and a maximum flow position, said first and second plates each including a plurality of orifices therethrough, the plurality of orifices through said first plate being alignable with the plurality of orifices through said second plate, the total area of the aligned portions of said plurality of said orifices being continuously variable from a predetermined minimum when said plates are adjusted to said minimum flow position to a predetermined maximum when said plates are adjusted to said maximum flow position.

4. The adjustable landing gear of claim 3, further comprising means for adjusting said plates with respect to each other in response to said velocity signal.

5. An adjustable landing gear for use with an aircraft, comprising, in combination:
    means for measuring a vertical descent velocity of said aircraft and producing a velocity signal in response thereto;
    a first strut having first and second ends defining a first axis, said first and second ends being separated by a variable first distance, said first strut including a fluid container enclosing a first fluid and first variable orifice means including adjustable first orifices through which said first fluid can pass, said first variable orifice means being adapted to receive said velocity signal, to produce a first desired rate signal indicative of a desired rate of change of the said variable first distance, and to adjust said first orifices in response to said first desired rate signal, said first fluid being caused to act upon said first variable orifice means in response to said first compressive force and being urged to pass through said first variable orifice means as said first compressive force varies, said first strut being attachable to said aircraft at said first end;
    a trailing arm having an upper first end pivotally secured to said second end of said first strut;
    a wheel attached to a lower end of said trailing arm, said wheel being rotatable about a horizontal axis; and
    a second strut pivotally connected to said trailing arm and being pivotally supported through said second end of said first strut, said second end of said first strut and said connection of said second strut to said trailing arm defining a second axis and being separated by a variable second distance, said second strut being subjected to a second compressive force along said second axis, said second strut including a fluid container enclosing a second fluid and second variable orifice means including adjustable second orifices through which said second fluid can pass, said second variable orifice means being adapted to receive said velocity signal, to produce a second desired rate signal indicative of a desired rate of change of the said variable second distance, and to adjust said second orifices through which said second fluid can pass in response to said second desired rate signal, said second fluid being caused to act upon said second variable orifice means in response to said second compressive force and being urged to pass through said second variable orifice means as said second compressive force varies, said first and second struts being independently compressible.

6. The adjustable landing gear of claim 5 wherein said first and second struts further respectively include means for producing actual first and second rate signals in response to the actual rates of change of said first and second distances, means for respectively producing first and second rate error signals in response to the differences between said respective first and second desired and actual rate signals, and means for respectively adjusting said respective first and second variable orifice means in response to said respective rate error signals.

7. The adjustable landing gear of claim 6 wherein said first and second variable orifice means each comprise a pair of mating orifice plates, each said pair of plates being continuously adjustable with respect to one another between a minimum flow position and a maximum flow position, each plate in each said pair of plates including a plurality of orifices therethrough, the plurality of orifices through one of each said pair of plates being alignable with the plurality of orifices through the other of each said pair of plates, the total aligned area of the plurality of said orifices in each of said pairs of plates being continuously variable from a predetermined minimum when each said pair of plates is adjusted to said minimum flow position to a predetermined maximum when each said pair of plates is adjusted to said maximum flow position.

* * * * *